Jan. 14, 1958　　　J. E. GUTRIDGE　　　2,819,687
FREIGHT VEHICLE TURNTABLE
Filed July 28, 1953　　　　　　　5 Sheets-Sheet 1
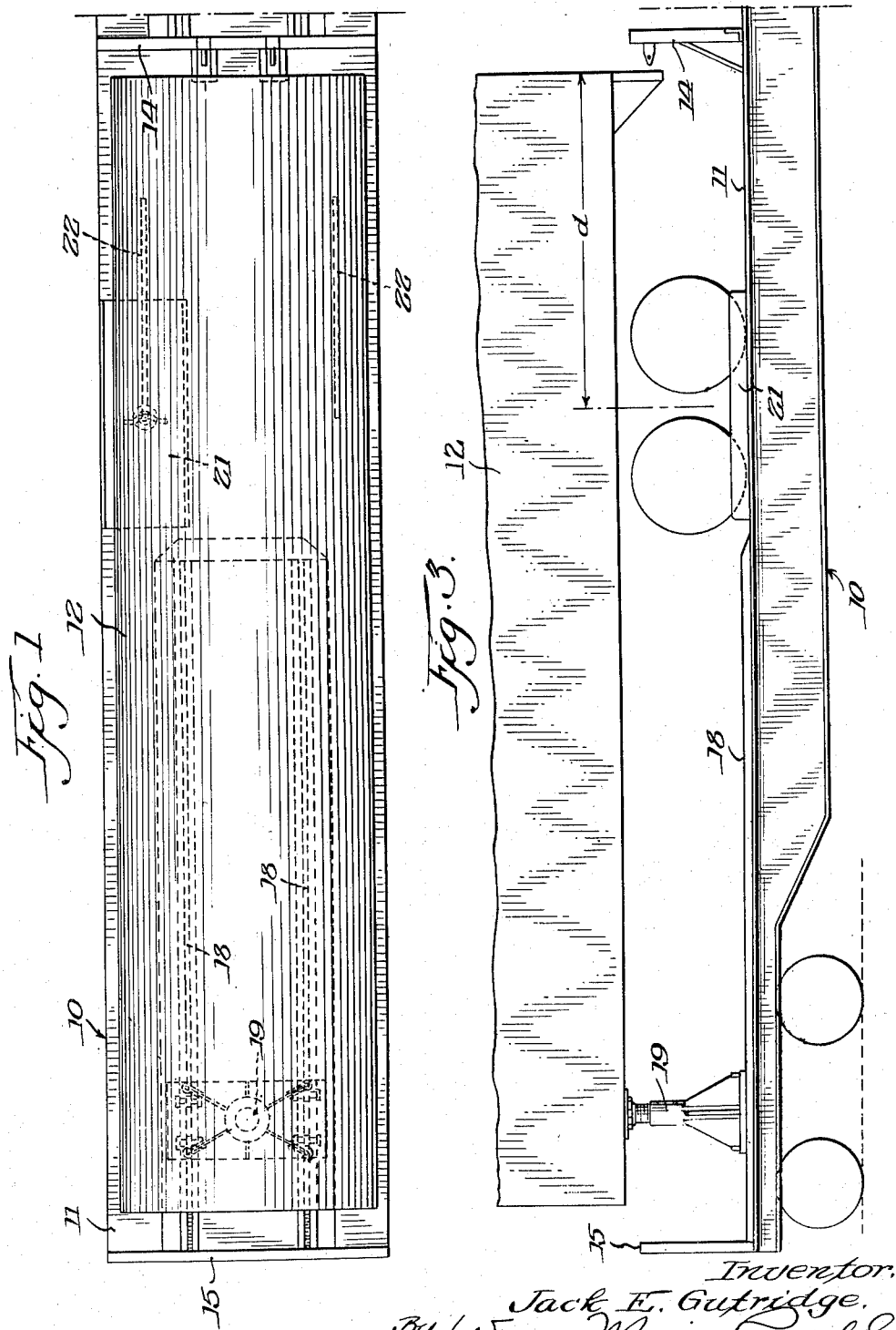
Inventor.
Jack E. Gutridge.
By Wayne Morris Russell
Atty Jan. 14, 1958 J. E. GUTRIDGE 2,819,687
FREIGHT VEHICLE TURNTABLE
Filed July 28, 1953 5 Sheets-Sheet 2
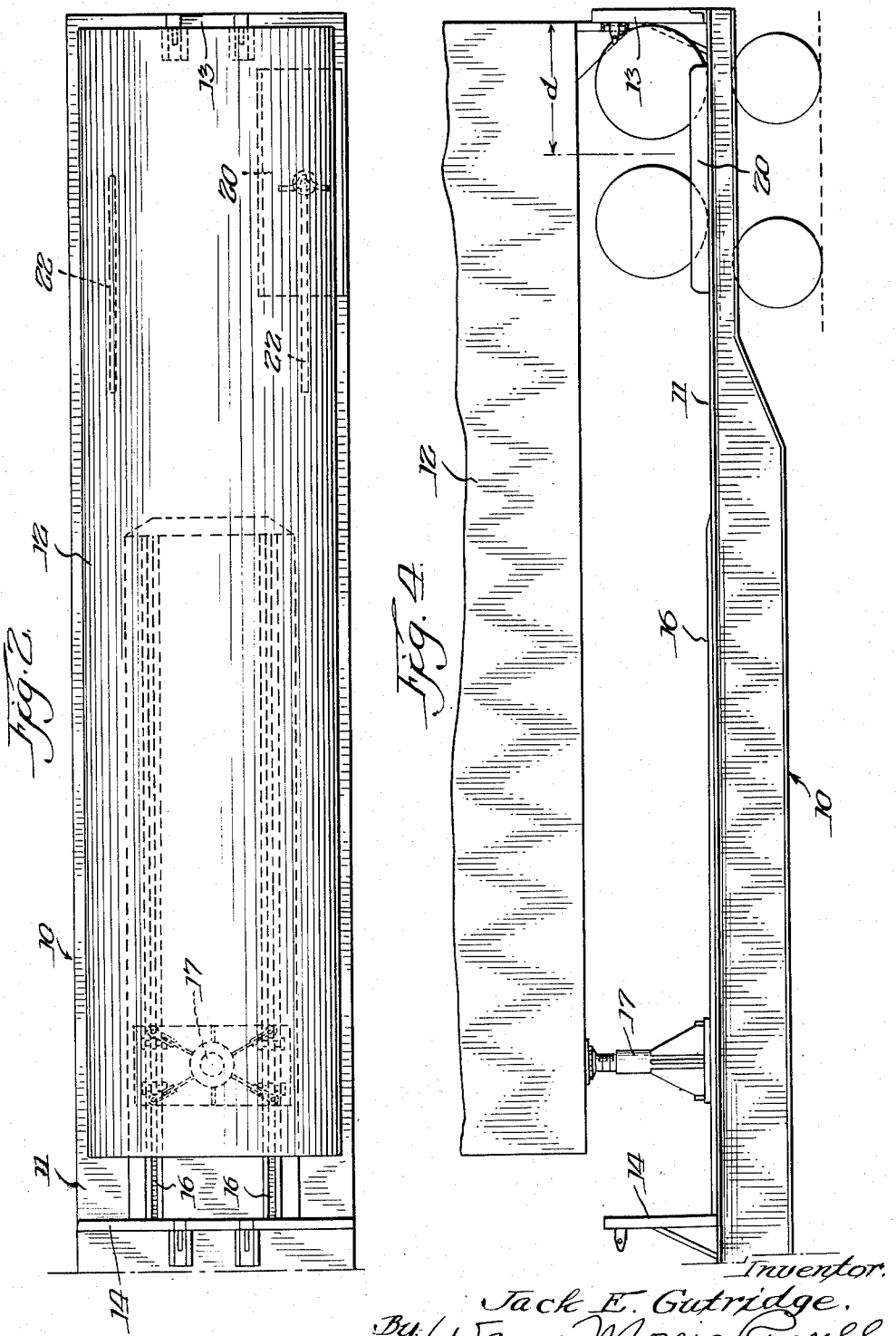
Inventor.
Jack E. Gutridge.
By Wayne Morris Russell Jan. 14, 1958   J. E. GUTRIDGE   2,819,687
FREIGHT VEHICLE TURNTABLE
Filed July 28, 1953   5 Sheets-Sheet 3
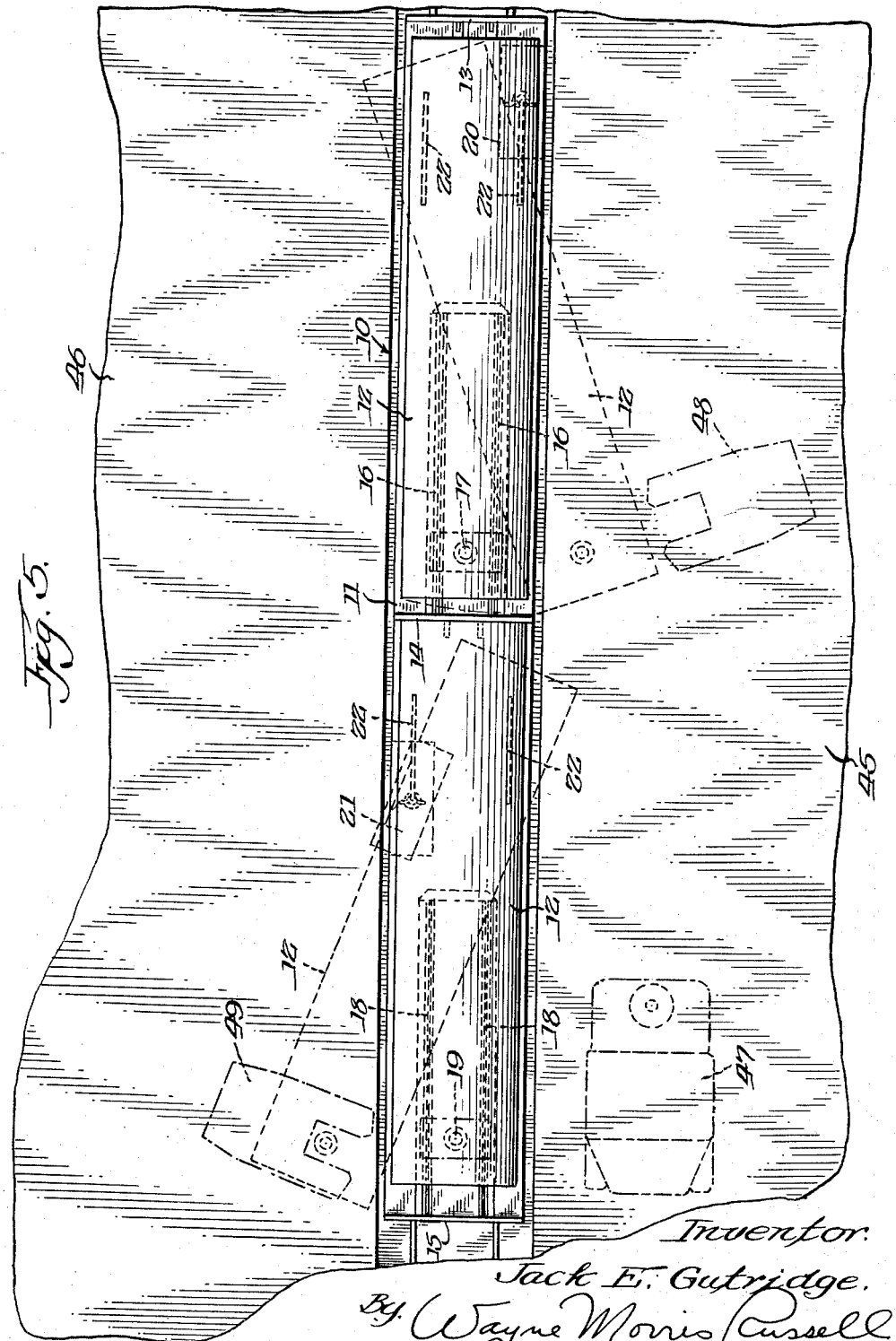

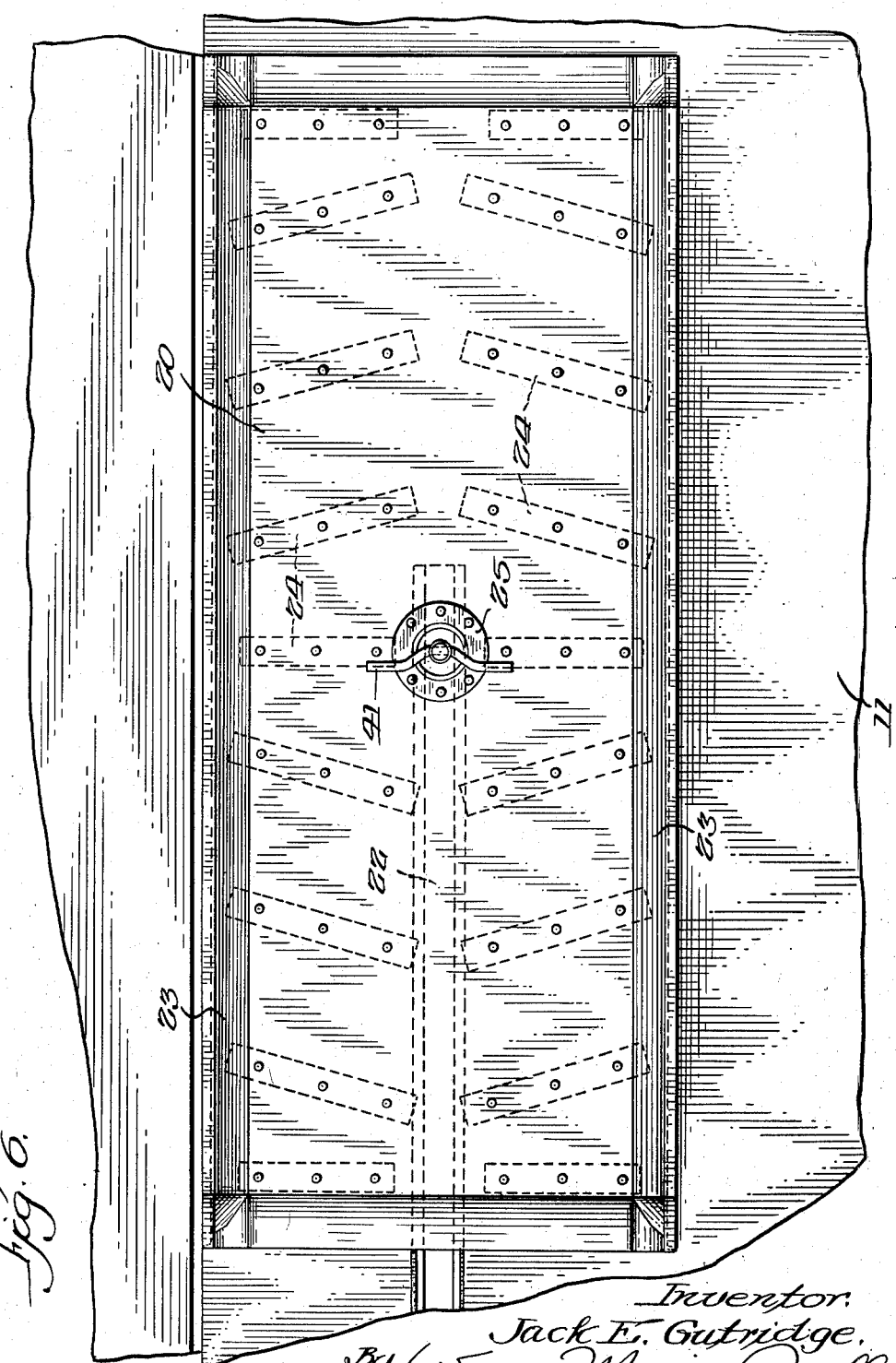

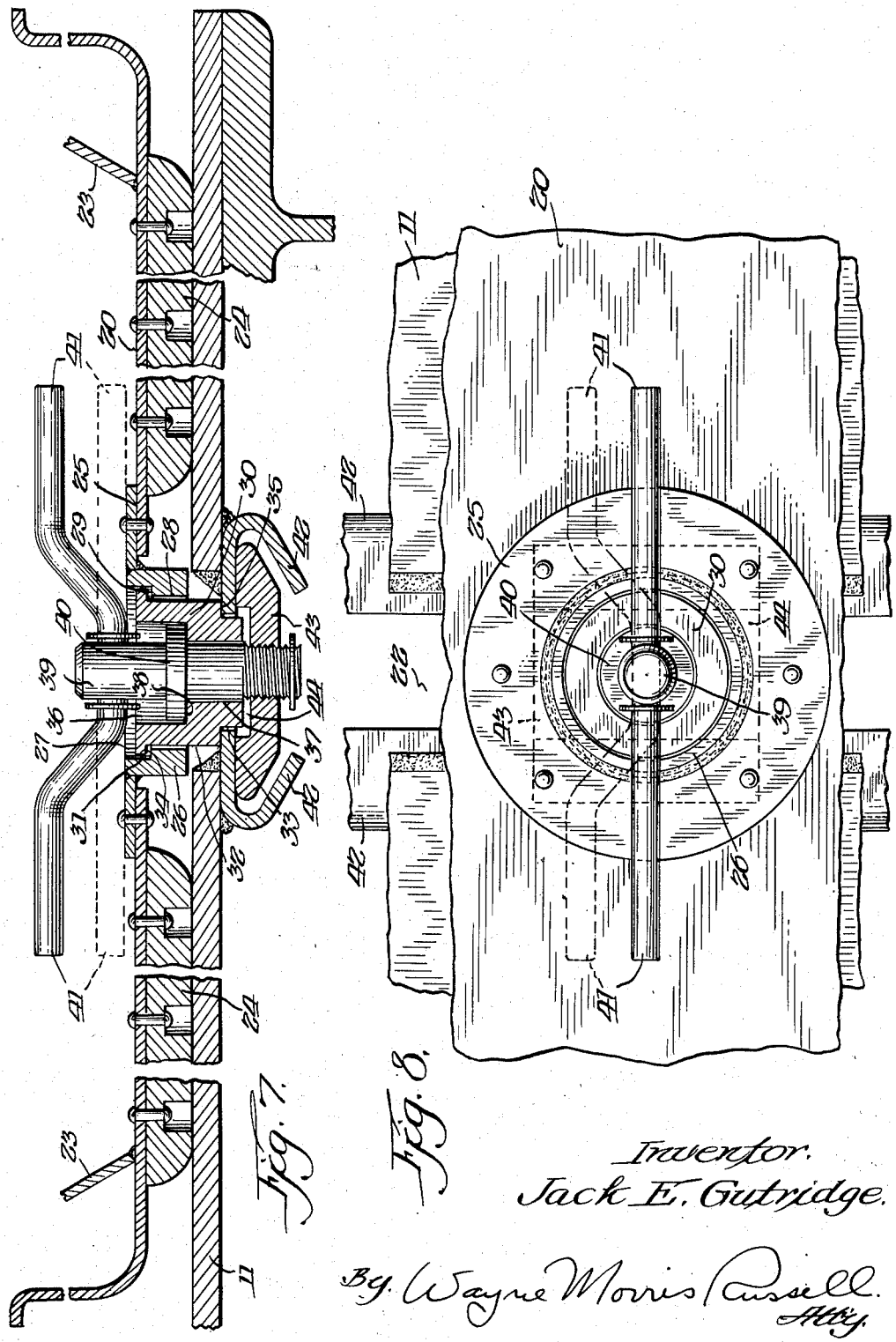

United States Patent Office 2,819,687
Patented Jan. 14, 1958

2,819,687

FREIGHT VEHICLE TURNTABLE

Jack E. Gutridge, Munster, Ind., assignor to Pullman-Standard Car Manufacturing Company, Chicago, Ill., a corporation of Delaware Application July 28, 1953, Serial No. 370,842

5 Claims. (Cl. 105—368)

This invention relates to freight vehicles and is primarily concerned with the apparatus and method of loading a vehicle on a freight vehicle.

The principal object of the invention is to provide an apparatus and method of loading a vehicle on a freight vehicle.

Another object of the invention is to provide a turntable pivotally mounted on the floor of a freight vehicle and the wheel at one side of a vehicle to be loaded on the freight vehicle being adapted to pivot on the turntable as the vehicle is being loaded on the freight vehicle.

An important object of the invention is to provide a method of loading a pair of vehicles on a freight vehicle from platforms on opposite sides of the freight vehicle.

Another object of the invention is to provide a freight vehicle turntable of novel construction.

A further object of the invention is to provide a new type of mechanism for rotatably and slidably mounting a turntable on the floor of a freight vehicle.

A further object of the invention is to provide a railway freight car having a turntable slidably mounted in a longitudinally extending slot in the floor of the car enabling the car to load and carry vehicles having different dimensions.

A more specific object of the invention is to provide a method of loading a truck trailer on a railway flat car employing a lift truck to back the rear end of the trailer onto the car and the rear wheels at one side of the trailer onto a turntable pivotally mounted on the floor of the car and then employing the lift truck to swing the front end of the trailer onto the car resulting in the wheels at the one side of the trailer pivoting on the turntable while the wheels at the other side roll on the floor of the car.

The foregoing and other objects of the invention are attained by the construction and arrangement illustrated in the accompanying drawings wherein—

Fig. 1 is a top plan view of one half of a railway flat car showing a truck trailer loaded on the car and showing the center support on the car;

Fig. 2 is a top plan view of the complemental other half of the railway flat car showing a second truck trailer loaded on the car and again showing the same center support;

Fig. 3 is a side elevational view of the half of the railway flat car and truck trailer shown in Fig. 1;

Fig. 4 is a side elevational view of the half of the railway flat car and truck trailer shown in Fig. 2;

Fig. 5 is a top plan view of a portion of a railroad terminal and showing the railway flat car and the two truck trailers on the car and the two trailers being shown in dotted lines during an intermediate step of their loading on the car;

Fig. 6 is a top plan detail view of one of the turntables upon which four wheels at one side of a truck trailer pivot as the trailer is loaded on the flat car;

Fig. 7 is a cross sectional view through the center of the turntable of Fig. 6 showing the turntable construction and the mechanism for rotatably and slidably attaching the turntable to the floor of the car; and Fig. 8 is a fragmentary top plan view of the turntable and its attaching mechanism and of the slot in the floor of the car in which the turntable slides.

The invention proposes an apparatus and method of loading a vehicle on a freight vehicle. A turntable is pivotally mounted intermediate its ends on the floor of the freight vehicle. This turntable has dimensions to accommodate the rear wheels at one side of the vehicle to be loaded on the freight vehicle. To load a vehicle on the freight vehicle a lift truck is used to back the rear end of the vehicle to be loaded onto the freight vehicle and rear wheels at one side of the vehicle is directed onto the turntable. Then the lift truck swings the front end of the vehicle to be loaded onto the freight vehicle resulting in the one rear wheel of the vehicle pivoting with the turntable while the other rear wheel of the vehicle rolls on the floor of the freight vehicle.

In the drawings, 10 generally designates a support or freight vehicle or railway flat car having a floor 11 and the usual trucks and the usual side sills which are here shown as I-beams. The railway flat car 10 has been particularly constructed to carry or transport a pair of vehicles or truck trailers 12. A stop or back support 13 is positioned at one end of the car and extends transversely thereof and is fixedly secured to the car and is adapted to be attached to the rear end of one of the trailers 12 to help hold it on the car while in transit. A similar stop or back support 14 is positioned centrally of the car and extends transversely of the car and is fixedly secured to the floor 11 of the car and is adapted to be attached to the rear end of the other trailer 12 to help hold it on the car while in transit. The support 14 is shown in Figs. 1 and 3 and again in Figs. 2 and 4. An end wall 15 is fixedly secured to the other end of the car and its purpose will be described later. A pair of spaced parallel guideways 16 are fixed on the floor 11 and extend longitudinally of the car from the back support 14 toward one end of the car and terminate at a substantial distance from the end of the car. A fifth wheel stand 17 is slidably mounted in the guideways 16 and is adapted to receive the fifth wheel pin of one of the trailers 12 so as to support the front end of the trailer while in transit. Another pair of spaced parallel guideways 18 are fixed on the floor 11 and extend longitudinally of the car from the end wall 15 toward the center of the car and terminate at a substantial distance from the center of the car. Another fifth wheel stand 19 is slidably mounted in the guideways 18 and is adapted to receive the fifth wheel pin of the other trailer 12 so as to support the front end of that trailer while in transit.

A turntable in the form of a channel member 20 is positioned adjacent one side and one end of the car and is pivotally mounted intermediate its ends on the floor 11. Another turntable in the form of a channel member 21 is positioned adjacent the other side of the car at a location spaced from the back support 14. The truck trailer illustrated has eight wheels adjacent its rear end consisting of a first pair of wheels disposed in front of a second pair of wheels at one side of the trailer and a third pair of wheels disposed in front of a fourth pair of wheels at the other side of the trailer. The two pairs of wheels at one side of a trailer are adapted to seat in one of the channel members when the trailer is being loaded on the car to assist in the moving of the trailer from a platform onto the car. From Figs. 3 and 4 it will be seen that either channel member will have a length and width to accommodate the two pairs of wheels at one side of the trailer. A pair of slots 22 located at opposite sides of the car in the floor 11 are provided for each turntable and these slots extend longitudinally of the car. Thus, each turntable may be pivotally mounted on the floor 11 at either side of the car in the desired slot permitting different ways of loading the trailers from platforms on opposite sides of the car.

Each turntable is made up of the channel member 20 or 21 which has a bottom and an integral flange on each side. A metal guide strip 23 is disposed in the channel member and extends substantially full length of the member and has one side edge spaced from one flange of the member and welded to one face of the bottom and has its other side edge welded to the flange of the member and another guide strip 23 is disposed in the channel member and extends substantially full length of the member and is welded to the face of the bottom and to the other flange of the member. A plurality of strips 24 are secured to the other face of the bottom of the member by rivets which are disposed in spaced recesses in the strips and extend part of the way through the strips and completely through the member. The strips 24 adjacent each end and at the center of the member are arranged in pairs in end to end spaced relation transversely of the member while the strips between the center and one end of the member are arranged in pairs in converging relation toward that end of the member while the strips between the center and the other end of the member are arranged in pairs in converging relation toward that end of the member. The purpose of the strips 24 is to support the channel member 20 or 21 on the floor 11 and when either channel member is rotated or slid along one of the slots these strips slide on the floor. Each channel member 20 or 21 has a circular aperture at its center. An annular plate 25 is positioned about the aperture in the respective channel member and is riveted to the member. A circular sleeve 26 has one end welded to the plate 25 and is provided with an opening 27 of one diameter and another opening 28 of a smaller diameter concentric with the opening 27 and forming a shoulder 29. A circular sleeve 30 has a periphery 31 at one end of one diameter and a periphery 32 intermediate its ends of a smaller diameter and a periphery 33 at its other end of a smaller diameter than the periphery 32, the reduced diameters forming shoulders 34 and 35. The sleeve 30 is positioned in the sleeve 26 and projects there through into one of the slots 22 in the floor 11 and the shoulder 34 on the sleeve 30 is adapted to engage the shoulder 29 on the sleeve 26 to prevent vertical upward movement of the turntable and to permit free rotative movement of the turntable with respect to the sleeve 30. The sleeve 30 is provided with an opening 36 of one diameter and a concentric opening 37 of a smaller diameter forming a shoulder 38 at the point of communication of the openings 36 and 37. A pin 39 has a hole extending transversely therethrough adjacent one end and has threads at its other end and an integral collar 40 extends therearound intermediate its ends and substantially midway of its length. The pin 39 extends through the openings 36 and 37 in the sleeve 30 and the collar 40 engages the shoulder 38 of the sleeve. A handle 41 extends loosely through the hole in the pin 39 and has handholds thereon adapted to be grasped by the operator and the handle is adapted to rotate by gravity to a position against the plate 25 when released by the operator as best shown by its dotted line position in Figs. 7 and 8. Washers are welded on the handle 41 at diametrically opposite faces of the pin 39 to prevent removal of the handle. A pair of spaced generally V-shaped elongated metal parts 42 are positioned on the underface of the floor 11 and extend along the walls of the adjacent slot 22. The parts 42 extend the full length of the slot and are welded to the walls of the slot and to the underface of the floor 11 as indicated in Fig. 7. A rectangular-shaped nut 43 is positioned between the parts 42 and is adapted to be threaded on the pin 39 and is provided with a recess 44 having a greater length and width than the diameter of the periphery 33 of the sleeve 30. Upon threading the pin 39 in the nut 43 the collar 40 engages the shoulder 38 of the sleeve 30 to force the periphery 33 of the sleeve between the parts 42 and into the recess 44 in the nut 43 and the shoulder 35 of the sleeve engages one face of one flange on each of the parts and the nut engages the other face of the same flange on each of the parts to securely clamp the sleeve and the nut against the parts to prevent movement of the channel member 20 or 21 along the adjacent slot 22. A snap ring is engaged on the threads of the pin 39 to prevent unscrewing of the pin to such an extent as to disconnect it from the nut 43.

The turntables are rotatable at all times and by lifting the handle 41 from its dotted line position in Figs. 7 and 8 to its solid line position in those figures either turntable can be rotated with ease, however, the turntable can be rotated with the handle in the dotted line position but due to the friction of the handle on plate 25 and the rivets in plate 25 rotation will not be as easy. To move one of the turntables longitudinally of the car in the adjacent slot 22 the handle 41 is turned to partly unscrew the pin 39 from the nut 43. The nut 43 cannot rotate since it is rectangular and is disposed between the parts 42. Since the nut 43 will move downwardly by gravity toward the lower flanges of the parts 42 the sleeve 30 and the upper flanges of parts 42 and the nut 43 will be loose with respect to each other and either the turntable or the handle 41 can be grasped by the operator to move the turntable along the adjacent slot 22. To move either turntable from the slot 22 on one side of the car to the opposite slot on the other side of the car the operator removes the snap ring from the threads on pin 39 with a tool and then turns the handle 41 to unscrew the pin from the nut 43. The turntable, sleeve 30, pin 39, and handle 41 can be lifted out of the slot at one side of the car and then placed in the opposite slot at the other side of the car. The nut 43 can be removed from the first named slot by sliding it between the parts 42 to the adjacent ends of those parts and the nut can be placed in the other slot by sliding it between the parts. The nut 43 is slid under the pin 39 and the handle 41 is turned to screw the pin into the nut.

In Fig. 5 is shown a portion of a railroad terminal. This terminal is made up of a railroad track and a flat car is disposed on the track and platforms or loading areas 45 and 46 are located on opposite sides of the car and are flush with the floor of the car. The flat car is moved onto the railroad track and remains in a stationary position until two trailers have been loaded on it.

The lift trucks for loading the trailers on the flat car are of a special type built for either longitudinal or lateral movement. Each lift truck has two front wheels for longitudinal movement of the lift truck and these wheels can rotate about only one axis. The lift truck has two other front wheels arranged transversely of the lift truck for lateral movement of the same and these wheels can rotate about only one axis and the wheels are retractible into the lift truck and can be lowered to raise the first mentioned two front wheels off the ground when lateral movement of the lift truck is desired. The lift truck has one rear wheel which is the drive wheel and which is movable through an angle of 180 degrees so that the wheel can be directed in either a longitudinal or a lateral direction.

The method of loading the trailers on the flat car is as follows: A truck tractor 47 pulls its trailer to the terminal and leaves it on the platform or loading area 45 in a position parallel to the railroad track and in front of the space it will occupy on the flat car when loaded on the car. Another truck tractor pulls its trailer to the terminal and leaves it on the platform or loading area 46 in a position parallel to the railroad track and in front of the space it will occupy on the flat car when loaded on the car. Then the operator moves the turntable 20 to the diagonal position shown on the left hand side of Fig. 5. A lift truck 48 on the platform 45 then lifts the front end of the trailer on that side off the platform through the engagement of an attachment on the lift truck with the fifth wheel pin on the trailer and then moves the rear end of the respective trailer backwards onto the floor of the car and at the same time directing the two pairs of wheels at one side of the trailer onto the turntable 20 (arranged at the diagonal position) on that side. The lift truck 48 then moves the front end of the trailer onto the floor of the car with the trailer pivoting on the turntable 20 as the front end of the trailer is being moved onto the floor of the car and the other two pairs of wheels at the other side of the trailer roll and slide on the floor 11 as the front end of the trailer is being swung onto the floor of the car. Then the lift truck 48 backs the trailer longitudinally of the car until the rear end of the trailer comes into engagement with the stop 13 which has projections thereon which engage the rear end of the trailer. Then the lift truck 48 lowers the front end of the trailer until the fifth wheel pin on the trailer comes into engagement with the fifth wheel stand 17 and the lift truck then backs away to complete the loading of one trailer on the flat car.

To load the other trailer on the flat car a lift truck 49 lifts the front end of the trailer off the platform 46 and backs the rear end of the trailer onto the flat car and then swings the front end of the trailer onto the car and backs the trailer longitudinally of the car until the rear end of the trailer comes into engagement with the stop 14. The lift truck 49 then lowers the front end of the trailer until it comes into engagement with the fifth wheel stand 19 to complete the loading of the second trailer and then backs away. The end wall 15 prevents the lift truck 49 from accidentally going over the end of the flat car while loading a trailer on the car. The two trailers can be loaded on the car independently of each other and either trailer can be loaded first or both trailers can be loaded at substantially the same time. The turntables 20 and 21 can be mounted on the same side of the car so that the two trailers can be loaded from one side of the car where desired.

The two trailers carried by a flat car can both be loaded on the car by the same lift truck, for example, the lift truck could load one trailer from the platform 45 and then move across the car to platform 46 and load the other trailer on the car and in this same manner load other cars in a train.

The method of unloading one trailer is as follows: The lift truck moves onto the flat car and lifts the front end of the trailer off the fifth wheel stand 17 and swings the front end of the trailer onto the platform. The lift truck then pulls the rear end of the trailer off the car onto the platform and then parks the trailer where it is ready to be hauled away by the truck tractor 47. The method of unloading the other trailer and those on other cars in a train is performed in a similar manner.

The distance $d$ from the centerline of the rear wheels of a trailer to the rear end of the trailer varies for different models of trailers. Thus the distance $d$ for the trailer shown in Fig. 3 differs from the distance $d$ for the trailer in Fig. 4. The slots 22 in the floor 11 of the car in which the turntables are slidable allow any model of trailer to be loaded on the car by simply moving the turntable to its proper position in the slot. The fifth wheel stands are slidable longitudinally of the car in their guideways and may be brought directly under the fifth wheel pin of any trailer regardless of the distance $d$ for the trailer.

Under the old way of loading truck trailers on flat cars a number of flat cars were arranged in end to end relation on a railroad track and each trailer backed across all of the flat cars so if anything went wrong with one lift truck for a certain trailer all of the rest of the trailers were held up. By experiment it was found that if the rear end of a truck trailer were moved onto a flat car and then the front end of the trailer was swung onto the car without a turntable for the trailer wheels the tires would come off the wheels of the trailer.

Where there is a number of flat cars arranged in end to end relation applicant's turntable permits side loading of the trailers on the flat cars. The trailers may all be loaded on the flat cars from the same side of the cars from one platform or on both sides of the cars from two platforms.

With a number of flat cars arranged in end to end relation and using the turntable of the present invention truck trailers can be loaded on all of the flat cars at the same time and the loading of every truck trailer is entirely independent of any other truck trailer, that is, if one lift truck breaks down only the loading of one trailer will be delayed. Since all of the trailers can be loaded independently the time required to load them will be small in comparison to the old way of loading trailers. As stated, each flat car can carry two trailers and the loading of one trailer on that car is independent of the loading of the other trailer on that car, that is, the two trailers can be loaded on the car at different times or at substantially the same time. The apparatus and method of loading and unloading trailers invented by applicant prevents heavy traffic at a railroad terminal and provides for smooth and efficient loading and unloading operations at the terminal.

The turntable of the present invention can also be used where truck trailers have to be parked in a restricted space.

From the foregoing it will be seen that there has been provided an apparatus and method for loading truck trailers on railway flat cars in which the loading of each trailer is independent of the loading of every other trailer in the area whether trailers are being loaded on a number of coupled flat cars or on a single flat car.

What is claimed is:

1. In a freight vehicle, a floor provided with a slot, a member positioned on the floor adjacent the slot, a sleeve engaging the member and extending through the slot, a pin extending through the sleeve and through the slot and having a collar extending therearound and threads thereon, a pair of spaced parts positioned on the underface of the floor and extending along the slot and secured to the floor, and a nut positioned between the parts and adapted to be threaded on the pin, upon threading the pin in the nut the collar on the pin engaging the sleeve to force the sleeve against the parts and the nut engaging the parts to prevent movement of the member along the slot.

2. In a freight vehicle, a floor provided with a slot extending longitudinally of the freight vehicle, a member positioned on the floor adjacent the slot and having an aperture therein, an annular plate positioned over the aperture in the member and secured to the member, a first sleeve positioned in the plate and secured thereto, a second sleeve positioned in the slot in the floor and in the first sleeve and adapted to engage the first sleeve, a pin having a handle at one end and threads at its other end and a collar extending therearound intermediate its ends and the pin extending through the second sleeve and the slot in the floor, a pair of spaced parts positioned on the underface of the floor and extending along the slot and secured to the floor, and a nut positioned between the parts and adapted to be threaded on the pin, upon threading the pin in the nut the collar on the pin engaging the second sleeve to force the second sleeve against the parts and the nut engaging the parts to prevent movement of the member along the slot.

3. In a freight vehicle, a floor provided with a slot extending longitudinally of the freight vehicle, a member positioned on the floor adjacent the slot and having an aperture therein, a plurality of strips disposed on the underface of the member and secured thereto, an annular plate positioned over the aperture in the member and secured to the member, a first sleeve positioned in the plate and secured thereto and the sleeve being provided with a first opening therein of a certain diameter and a second opening therein of a smaller diameter than the first opening and concentric with the first opening and a first shoulder being formed at the first and second openings, a second sleeve having a first periphery at one end of a certain diameter and having a second periphery intermediate its ends of a smaller diameter than the first periphery and having a third periphery at its other end of a smaller diameter than the second periphery and the first and second peripheries forming a first shoulder and the second and third peripheries forming a second shoulder, the second sleeve being positioned in the slot in the floor and in the first sleeve and the first shoulder on the second sleeve being adapted to engage the first shoulder on the first sleeve, the second sleeve being provided with a first opening of a certain diameter and a second opening of a smaller diameter than the first opening and concentric with the first opening and a third shoulder being formed at the first and second openings, a pin having a hole extending transversely therethrough adjacent one end and having threads at its other end and an integral collar extending therearound intermediate its ends, the pin being disposed in the second sleeve with the collar engaging the third shoulder, a handle extending loosely through the hole in the pin and having handholds thereon and the handle being adapted to rotate by gravity to a position against the plate when released by the operator, a pair of spaced parts positioned on the underface of the floor and extending along the slot and secured to the floor, and a nut positioned between the parts and adapted to be threaded on the pin and provided with a recess having a greater length and width than the diameter of the third periphery of the second sleeve, upon threading the pin in the nut the collar on the pin engaging the third shoulder of the second sleeve to force the third periphery of the second sleeve between the parts and into the recess in the nut and the second shoulder of the second sleeve engaging the pair of parts and the nut engaging the pair of parts to prevent movement of the member along the slot.

4. A turntable comprising a channel member having a bottom and an integral flange on each side of the bottom, a first metal strip disposed in the channel member and having one side edge spaced from one flange of the member and secured to one face of the bottom and having its other side edge secured to said one flange, a second metal strip disposed in the channel member and having one side edge spaced from the other flange of the member and secured to said one face of the bottom and having its other side edge secured to said other flange, and a plurality of strips secured to the other face of the bottom of the member.

5. In a freight vehicle, a floor, a channel member mounted on the floor and adapted to aid in the loading of a vehicle on the freight vehicle and having a bottom and an integral flange on each side of the bottom, a first metal strip disposed in the channel member and having one side edge spaced from one flange of the member and secured to one face of the bottom and having its other side edge secured to said one flange, a second metal strip disposed in the channel member and having one side edge spaced from the other flange of the member and secured to said one face of the bottom and having its other side edge secured to said other flange, and a plurality of strips secured to the other face of the bottom of the member.

References Cited in the file of this patent

UNITED STATES PATENTS

| 860,312 | Moore | July 16, 1907 |
| 1,394,489 | Funkhouser et al. | Oct. 18, 1921 |
| 1,504,558 | Hawley | Aug. 12, 1924 |
| 1,603,321 | Cook | Oct. 19, 1926 |
| 1,606,654 | Menges | Nov. 9, 1926 |
| 1,668,530 | Romine | May 1, 1928 |
| 1,734,303 | Ross | Nov. 5, 1929 |
| 1,875,052 | Ljungkull | Aug. 30, 1932 |
| 1,968,196 | Francis | July 31, 1934 |
| 2,170,581 | West et al. | Aug. 22, 1939 |
| 2,204,667 | Dooley et al. | June 18, 1940 |
| 2,605,007 | Gaynor | July 29, 1952 |

FOREIGN PATENTS

| 367,941 | Italy | Feb. 6, 1939 |